UNITED STATES PATENT OFFICE.

HENRY L. PRESTHOLDT, OF MINNEAPOLIS, MINNESOTA.

CASEIN GLUE.

No Drawing.    Application filed April 17, 1922.   Serial No. 554,200.

My invention provides a new composition of matter herein designated as "casein glue", but which from its broader aspect is an adhesive compound adapted to be used, by itself or commingled with other substances, as an adhesive coating.

In this improved adhesive composition, casein is used as an adhesive base and is commingled with potassium aluminate, yellow prussiate of potash, calcium oxide, sodium hydroxide, sodium silicate, and an oil, preferably kerosene.

The yellow prussiate of potash serves to effect a clear solution of the casein colloids when the silicate of soda is used.

The above composition affords a wonderfully efficient adhesive for many purposes, and especially for the gluing together of such things as wood to metal, and for mending chinaware and the like.

I have obtained a very highly efficient glue or adhesive by the use of the above noted substances in accordance with the following formula:

|  | Parts. |
|---|---|
| Casein | 50 to 75 |
| Potassium aluminate | 3 to 12 |
| Yellow prussiate of potash | 1 to 4 |
| Calcium oxide | 10 to 30 |
| Sodium hydroxide | 3 to 12 |
| Sodium silicate | 1 to 15 |
| Kerosene | 1 to 4 |

The above noted substances, except kerosene, are commingled in dry or powder form, and the kerosene is in such small quantity that it does not make the powdered mass pasty, but keeps the same from getting in dust form. The composition is sold in this dry form and when it is to be used, it will be introduced into water to form an emulsion. It is then, of course, that the chemical reactions that develop the adhesive qualities of the composition, will take place.

Casein has well established adhesive properties when the proper solvents are employed to bring out the colloids. Calcium oxide, together with potassium aluminate, is a casein solvent together with water. Calcium forming in casein in combination with calcium oxide forms calcium caseinate, imparting to the glue mixture a water-resistant quality. Yellow prussiate of potash is necessary in order to increase the liquid life of the property. Sodium silicate is added for the purpose of decreasing the cost of the glue mixture, but it is necessary to use sodium hydroxide as an additional solvent for both the casein and the sodium silicate. Kerosene oil is used for the purpose of preventing the calcium oxide from deteriorating and forming a calcium carbonate. Kerosene is especially useful to keep down dust in the process of manufacture, but it may be omitted without vitally changing the character of the composition.

What I claim is:

An adhesive composition made substantially in accordance with the following formula, towit:

|  | Parts. |
|---|---|
| Casein | 50 to 75 |
| Potassium aluminate | 3 to 12 |
| Yellow prussiate of potash | 1 to 4 |
| Calcium oxide | 10 to 30 |
| Sodium hydroxide | 3 to 12 |
| Sodium silicate | 1 to 15 |

In testimony whereof I affix my signature.

HENRY L. PRESTHOLDT.